Dec. 3, 1929.  B. M. FINE  1,737,789
MACHINE FOR FORMING ARTICLES FROM SHEET MATERIAL
Filed May 13, 1927  7 Sheets-Sheet 1

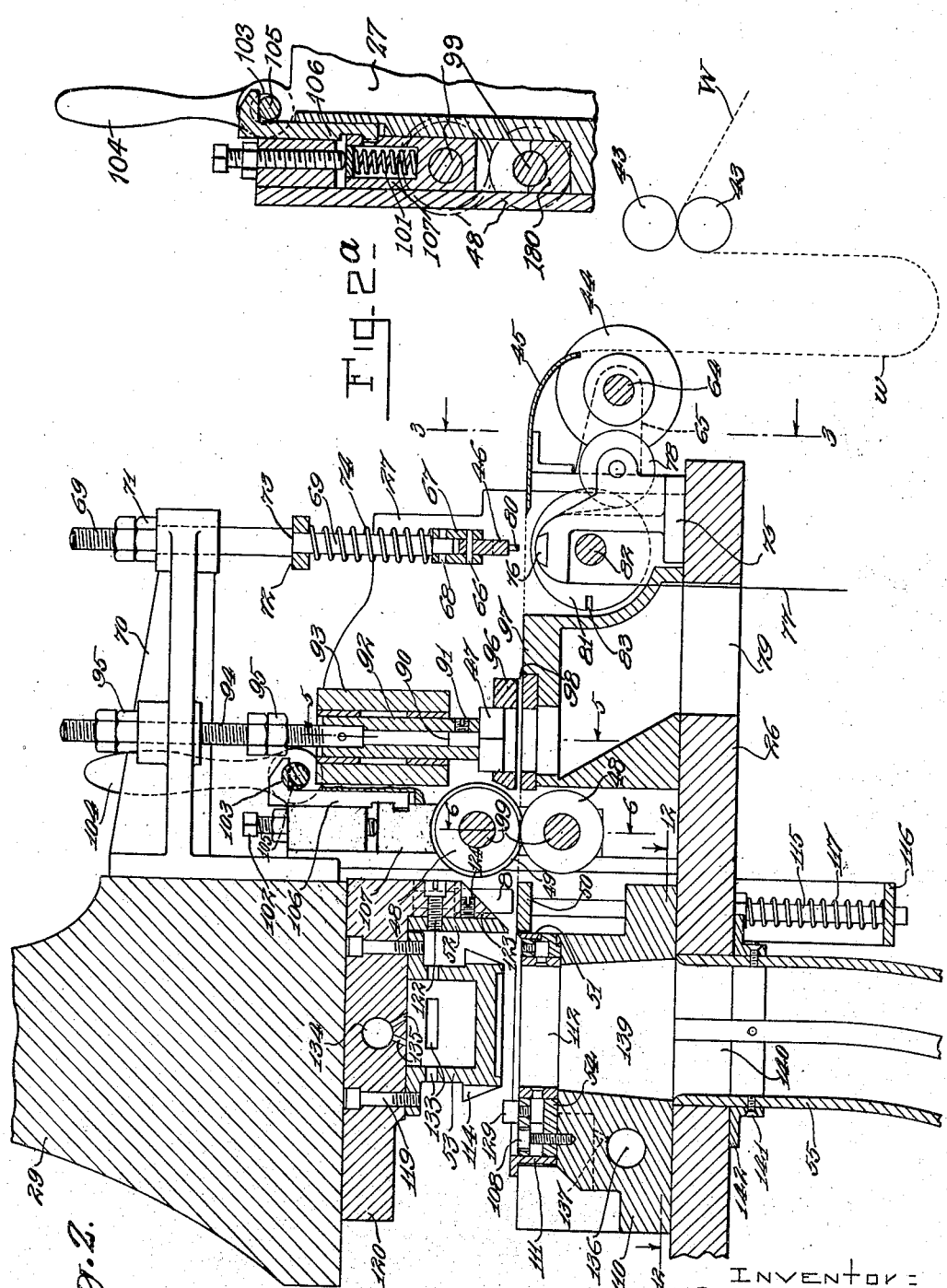

Dec. 3, 1929.  B. M. FINE  1,737,789
MACHINE FOR FORMING ARTICLES FROM SHEET MATERIAL
Filed May 13, 1927    7 Sheets-Sheet 3

INVENTOR:
Bernard M. Fine
by MacLeod, Calver, Copeland & Dike
Attys.

Dec. 3, 1929.　　　　　B. M. FINE　　　　1,737,789
MACHINE FOR FORMING ARTICLES FROM SHEET MATERIAL
Filed May 13, 1927　　　7 Sheets-Sheet 4

INVENTOR=
Bernard M. Fine,
by Macleod, Calver, Copeland & Dike,
Attys

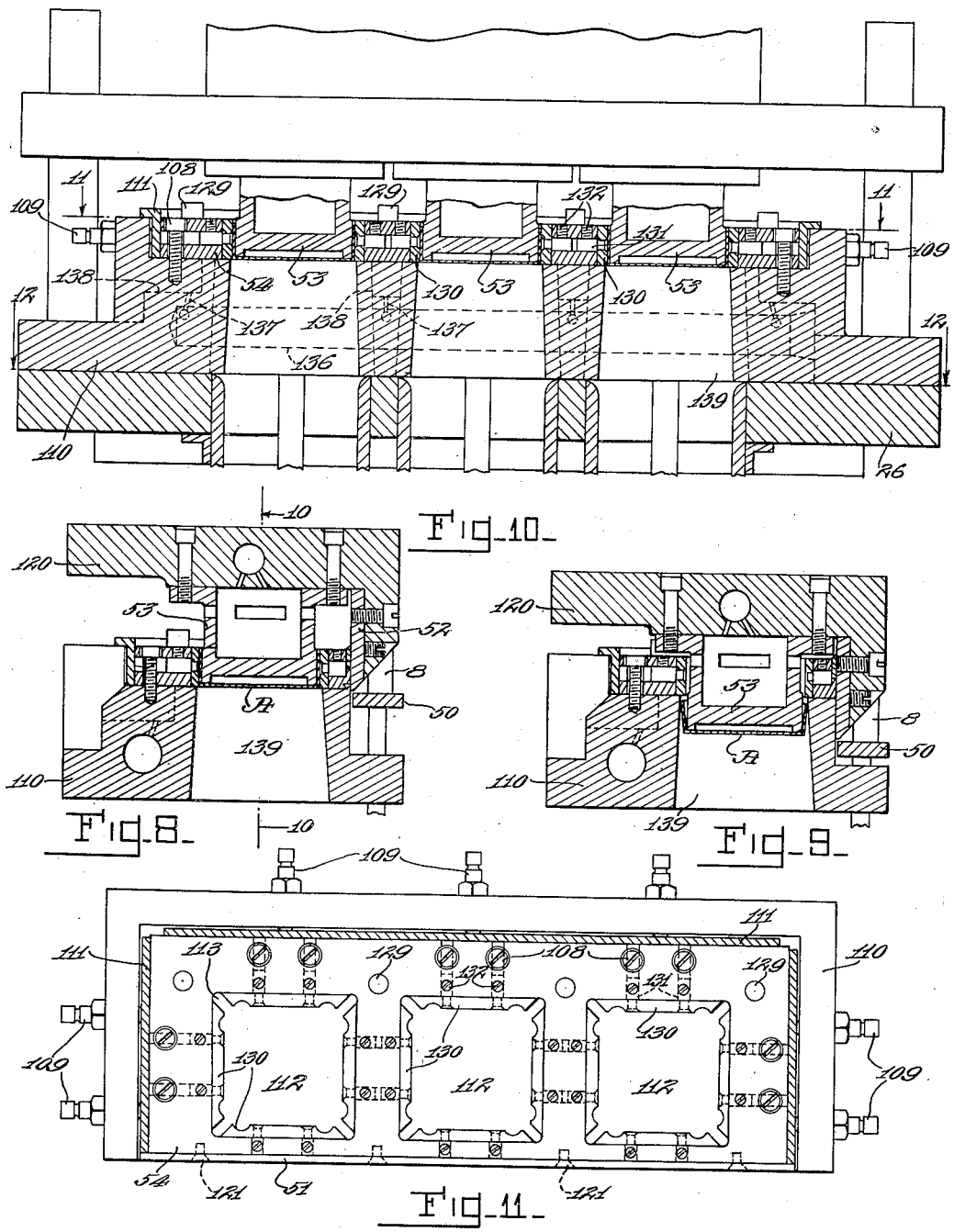

Dec. 3, 1929.      B. M. FINE      1,737,789
MACHINE FOR FORMING ARTICLES FROM SHEET MATERIAL
Filed May 13, 1927      7 Sheets-Sheet 6
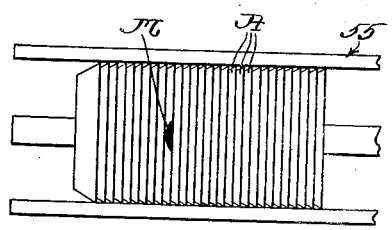
Fig-14-
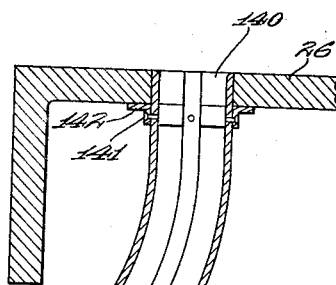
Fig-13-
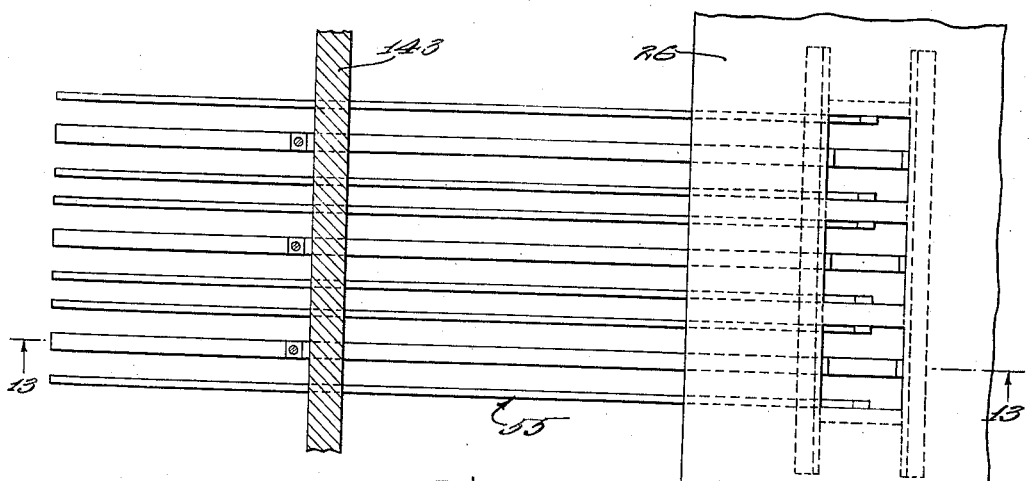
Fig-12-
INVENTOR:
Bernard M. Fine,
by Macleod, Calver, Copeland & Dike.
Attys- Dec. 3, 1929.  B. M. FINE  1,737,789
MACHINE FOR FORMING ARTICLES FROM SHEET MATERIAL
Filed May 13, 1927  7 Sheets-Sheet 7

INVENTOR:
Bernard M. Fine,
by MacLeod, Calver, Copeland & Dike
Attys.

Patented Dec. 3, 1929

1,737,789

UNITED STATES PATENT OFFICE

BERNARD M. FINE, OF PHILADELPHIA, PENNSYLVANIA, ASSIGNOR TO SANITARY PRODUCTS CORPORATION OF AMERICA, OF PHILADELPHIA, PENNSYLVANIA, A CORPORATION OF VIRGINIA

MACHINE FOR FORMING ARTICLES FROM SHEET MATERIAL

Application filed May 13, 1927. Serial No. 191,227.

This invention relates to machines for forming articles from sheet material, and especially, although not exclusively, to machines for forming plates and the like from paper or similar stock. The invention has for its general object the rapid and automatic production of articles of this character and their delivery in counted quantities in stacked or nested relation with a minimum waste of stock and a minimum amount of manual labor and personal supervision.

The more particular objects of the invention, together with means whereby the latter may be carried into effect, will best be understood from the following description of a preferred form thereof illustrated in the accompanying drawings. It will be understood, however, that the particular construction described and shown has been chosen for purposes of exemplification merely, and that the invention, as defined by the claims hereunto appended, may otherwise be embodied without departure from the spirit and scope thereof.

In said drawings:

Fig. 2 is an enlarged longitudinal section of a portion of the mechanism shown in Fig. 1.

Fig. 2ᵃ is a detail view illustrating the mounting of the journal boxes for the upper feed roll shaft.

Figure 3:
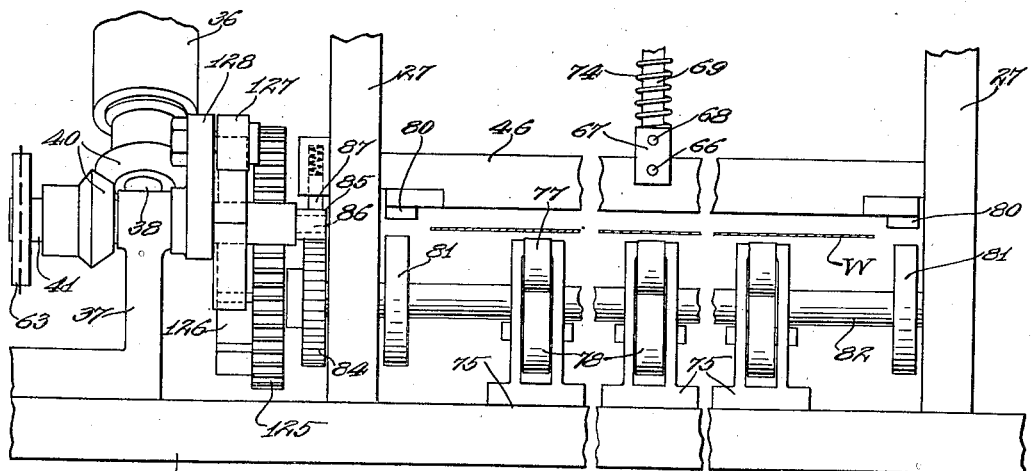
Figure 4A:
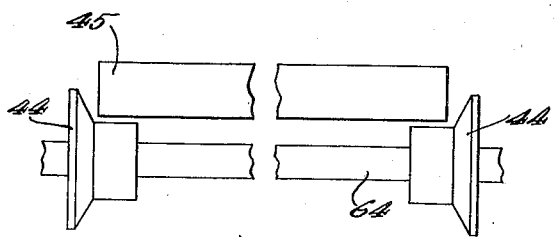

Fig. 3 is a fragmentary front elevation, partly in section substantially on line 3—3, Fig. 2.

Figure 4:
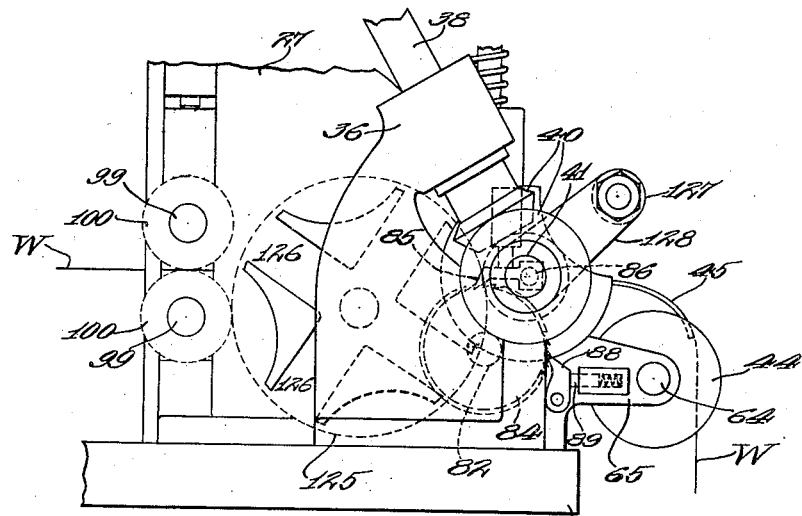

Fig. 4 is an enlarged fragmentary side elevation as viewed from the left of Fig. 3.

Fig. 4ᵃ is a detail front elevation of the web guiding or centering rollers.

Figure 5:
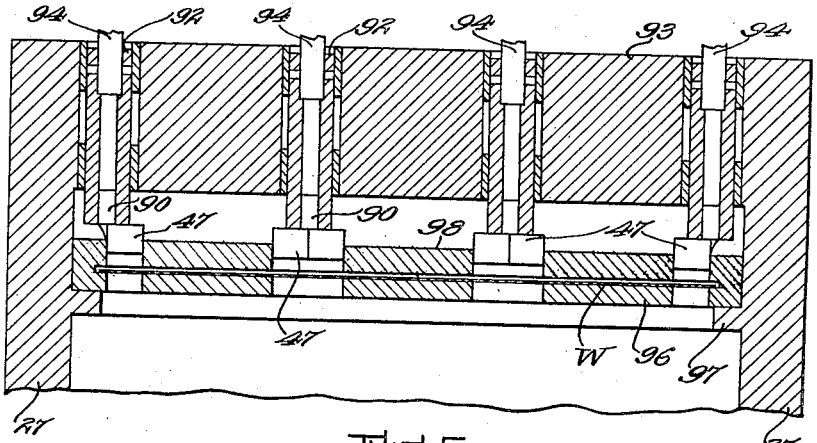
Figure 6:
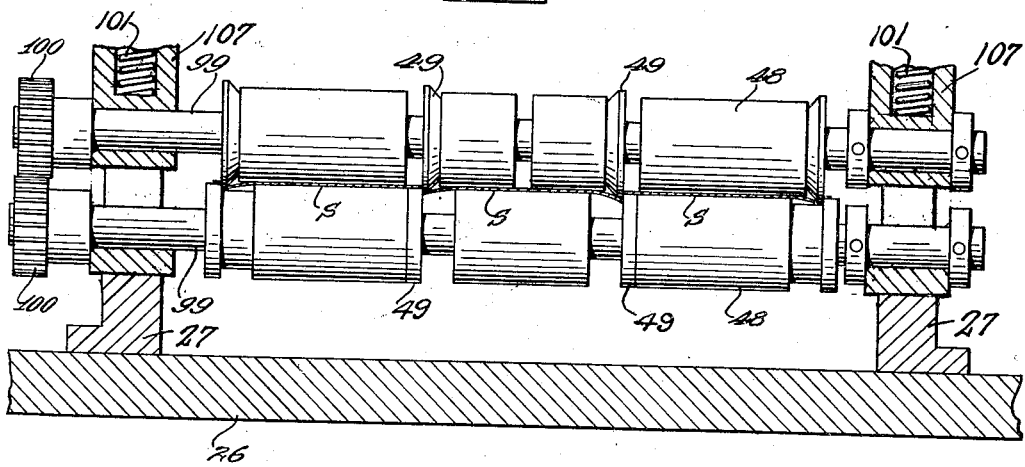

Figs. 5 and 6 are transverse sections taken substantially on lines 5—5 and 6—6 respectively, Fig. 2.

Figure 1:
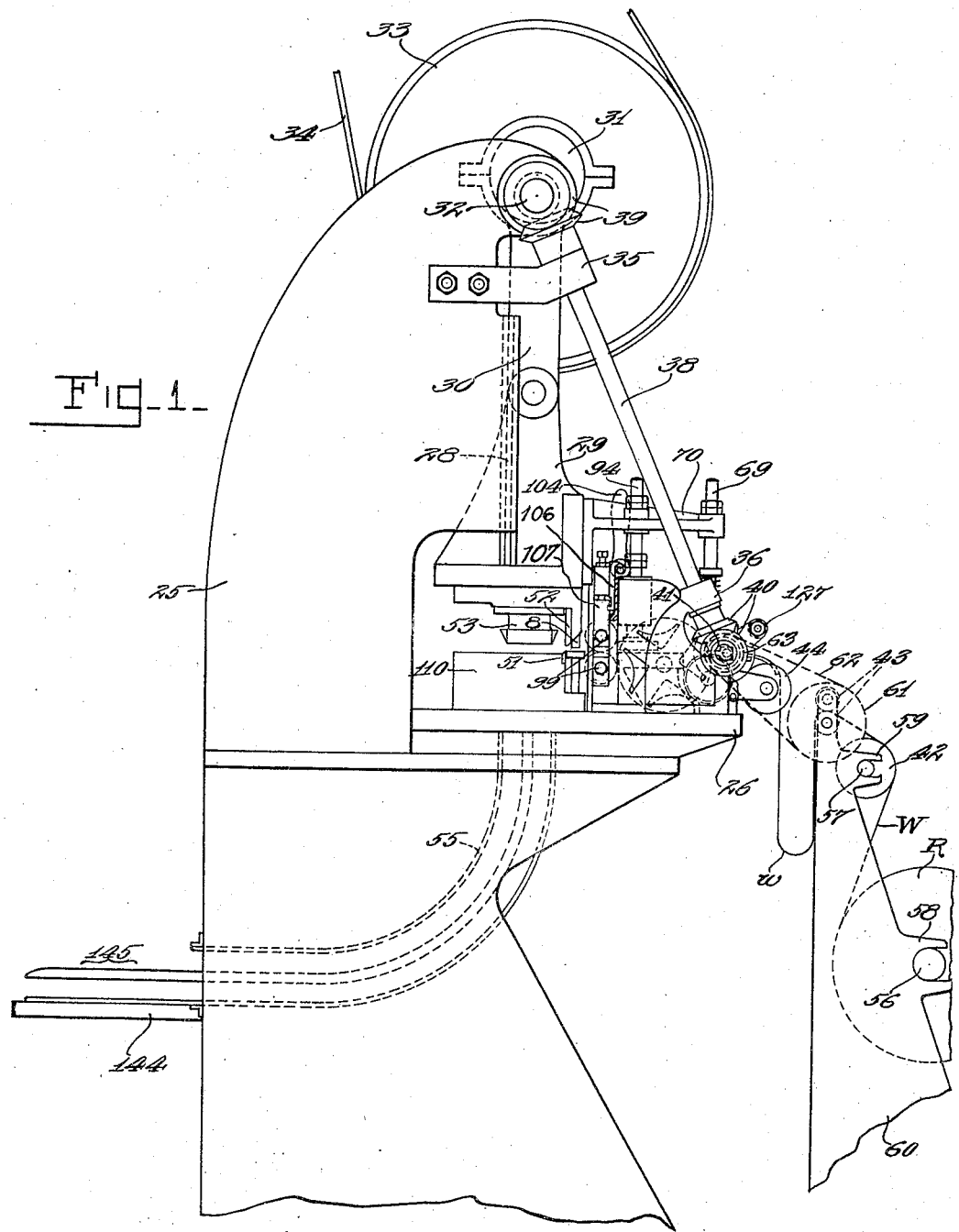
Fig. 1 is a side elevation of a machine embodying the invention, showing the parts in the positions assumed thereby just prior to the cross-cutting operation.
Figure 7:
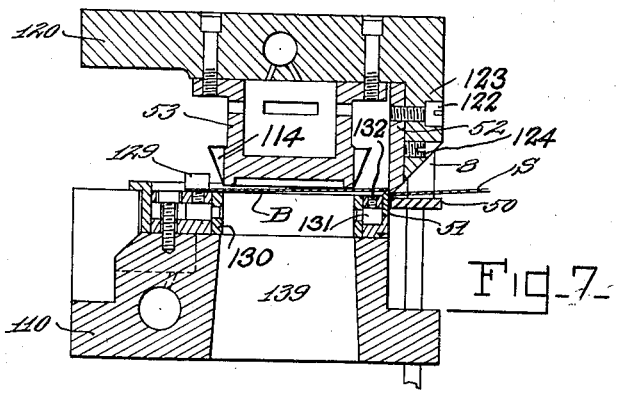

Fig. 7 is a fragmentary sectional view of the forming dies and associated parts shown in Figs. 1 and 2, illustrating the positions assumed by said parts after the cross-cutting operation and just prior to the forming operation.

Fig. 8 is a similar view illustrating the forming operation.

Fig. 9 is a similar view showing the positions assumed by the parts at the completion of the forming operation.

Fig. 10 is a transverse section taken substantially on line 10—10, Fig. 8.

Fig. 11 is a plan view of the lower forming dies and associated parts as viewed substantially from the line 11—11, Fig. 10.

Fig. 12 is a plan view of the stacking devices as viewed substantially from the lines 12—12, Figs. 2 and 10.

Fig. 13 is a vertical section taken substantially on the line 13—13, Fig. 12.

Fig. 14 is a detail plan view of the discharge end of one of the stackers, showing a nested group of plates therein.

Figure 15:
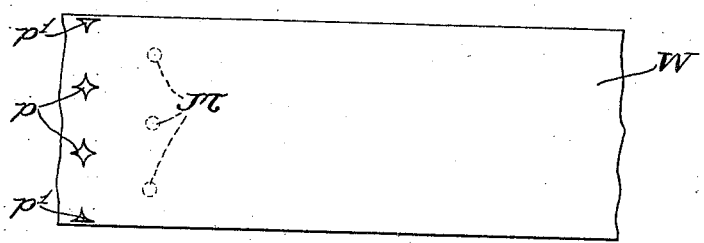
Figure 16:
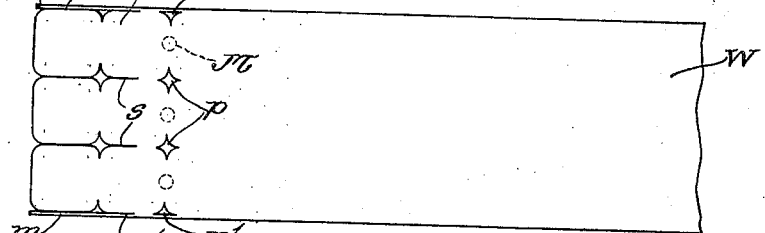
Figure 17:
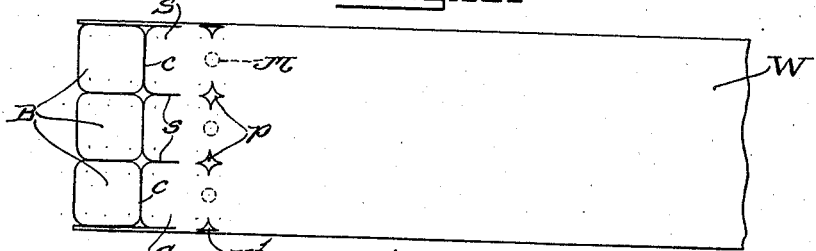

Figs. 15, 16 and 17 are diagrammatic plan views of a web illustrating the successive operations thereon.

Figure 18:
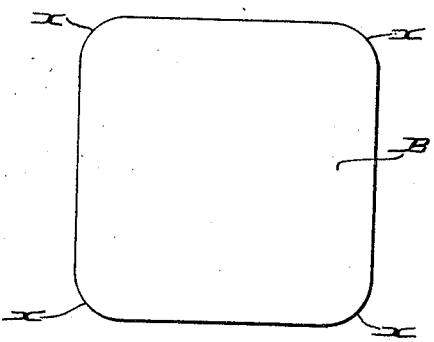
Figure 19:
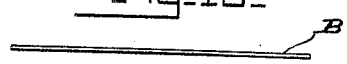

Fig. 18 is an enlarged plan view and Fig. 19 a side elevation or edge view of one of the blanks.

Figure 20:
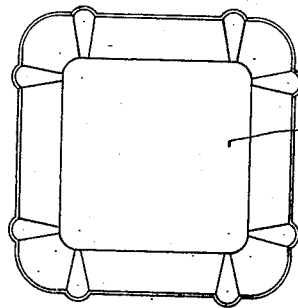
Figure 21:
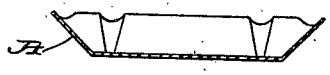

Figs. 20 and 21 are similar views of the completed plate.

For convenience of description, the general organization of the machine and the functions and cooperative relationship of the several instrumentalities will first be outlined and the preferred construction of these several instrumentalities individually thereafter described more in detail.

Referring to Figs. 1, 2 and 3, the invention is herein illustrated as embodied in a die press the frame of which, as shown, comprises a pair of side uprights 25 supporting between them a bed 26, an auxiliary framework carried by the bed 26 and including a pair of side uprights 27 and transverse portions hereinafter described more in detail, together with certain brackets and other supports hereinafter referred to. The side members 25 are formed with ways 28 in which is guided, for reciprocating movement toward and from the bed 26, a ram 29 connected by a link 30 with an eccentric 31 on a main shaft 32 journalled in suitable bearings in the uprights 25 and provided with a driving pulley 33 to which power from any suitable source, not shown, may be applied through a belt 34. Journalled in bearings 35 and 36 carried respectively by one of the side members 25 and by a bracket 37 supported on the bed 26, is an inclined upright shaft 38 connected at its upper end by bevel gearing 39 with the shaft 32 and at its lower end by bevel gearing 40 with a shaft 41 journalled in the bracket 37.

Referring to Figs. 15, 16 and 17, the sheet material from which the plates or other articles A (Figs. 20 and 21) are made is supplied in the form of a continuous web W which, during its passage through the machine, is slit longitudinally, as shown at s, to divide the same into strips S, and thereafter cut transversely, as shown at c, to divide the strips S into individual, substantially rectangular blanks B which are subsequently formed into articles A, these operations being substantially as disclosed and claimed in another application filed January 19, 1927, Serial No. 162,083. While the entire web may thus be divided into blanks without waste, the extreme marginal portions m thereof, which marginal portions are frequently soiled or marred, are preferably trimmed off by additional longitudinal slits s'. Also, in accordance with the desired shape of the finished articles A, the corners of the blanks B (see particularly Figs. 18 and 19) are preferably rounded or truncated as indicated at x. This, in accordance with the present invention, is preferably accomplished by perforating the web W prior to the longitudinal slitting thereof and at points in alinement with the longitudinal slits. The perforations p, which are alined with the slits s, are of the generally quadrilateral form shown and are disposed with their diagonals respectively longitudinal and transverse to the web, so as to round the meeting corners of four contiguous blanks, while the perforations p', which serve to round or truncate the outer corners of two contiguous outer blanks of the series, are alined with the slits s' and are of the correspondingly triangular form shown. Means are also provided for periodically marking the web W, as indicated at M, at points corresponding to the cross cuts c, whereby said marks M will appear at the edges of the completed articles. The marking means is controlled by counting mechanism synchronized with the article forming means so as to apply marks M to the web after the completion of a predetermined number of articles. As hereinafter explained, the articles, after their formation are delivered in stacked and nested relation, and by means of the marks M a group of plates of any desired number can be conveniently removed from the stack.

Referring again to Fig. 1, the web W is supplied from a reel R from which it is drawn over a guide roller 42 between a pair of feed rollers 43. In order to relieve the intermittent web feeding mechanism hereinafter described of the relatively heavy work of drawing the web from the reel and leave said feeding mechanism free for the accurate control of the web during its passage to the several instrumentalities of the machine, said web is drawn from the reel by the rollers 43 which are driven continuously at a speed equal to the resultant speed of travel of the web under the action of the intermittent feeding mechanism. The portion w of the web W withdrawn from the reel by the rollers 43 is disposed in a depending loop or bight, providing an amount of slack at all times sufficient to permit operation of the intermittent feeding mechanism without strain. From the loop or bight w the web passes between centering rollers 44 (see also Fig. 2) and over a guide plate 45, past the marker 46 and perforators 47, and between a pair of intermittently rotated feed rollers 48 (see also Fig. 6) having associated therewith cooperating cutting disks 49 adapted to slit the web longitudinally as it is fed. From the combined intermittent feeding and slitting rollers 48 the web passes over a stripper plate 50 and between cross-cutting devices comprising fixed and movable shearing blades 51 and 52. The blanks severed by the cross-cutting devices are received between upper and lower forming dies 53 and 54 by which they are formed into articles, the formed articles being received in nested relation in stackers or raceways 55.

The general organization of the machine, and the cooperative relationship of the several instrumentalities, having thus been outlined, the preferred construction and operation of these several instrumentalities will now be described more in detail.

Referring to Fig. 1, the reel R and guide roller 42 are preferably formed with trunnions 56 and 57 which are received in bearing sockets 58 and 59 formed on brackets 60 secured to the floor adjacent the press. The feed rollers 43 are journalled in bearings also preferably carried by the brackets 60 and are intergeared with one another for rotation in unison, the shaft of the lower roller being provided with a sprocket 61 connected by a chain 62 with a sprocket 63 (see also Fig. 3) on the continuously rotating shaft 41.

The centering rollers or disks 44 (see particularly Figs. 2 and 4ª) are carried by a shaft 64 journalled in brackets 65 carried by the side members 27 of the auxiliary frame. The inner faces of the rollers or disks 44 are of conical form and engage the edges of the web to center the same. The guide plate 45 is also supported by the brackets 65 and serves to guide the web from the centering rollers or disks 44 to the marker 46.

Referring to Figs. 2 and 3, the marker 46 comprises a transverse bar disposed to reciprocate vertically between the side uprights 27 of the auxiliary frame and pivoted intermediate its ends, at 66, between a pair of plates 67 secured, as by a pin 68, to the lower end of a rod 69 guided for vertical movement in an opening in a bracket 70 secured to and projecting forwardly from the ram 29. Downward movement of the rod 69 in the bracket 70 is limited by an adjustable stop 71, while upward movement thereof is yieldingly limited by a loose collar 72 on said rod normally held seated against a shoulder 73 on the rod by a spring 74 surrounding said rod and interposed between the collar 72 and the plates 67. It will be seen that when the ram descends, the bar 46 will descend with it until an obstruction is encountered, after which the rod 69 will move freely upwardly in the brackets 70 until the lower face of the latter is engaged by the collar 72. Thereafter, as the ram continues to descend, the rod 69 will continue to yield under the tension, however, of the spring 74, thereby applying a yielding pressure.

Disposed on the bed 26 immediately below the bar 46, and at the underside of the web at points transversely of the machine corresponding generally to the several strips S into which the web is subsequently divided, are brackets or standards 75 having, at their upper ends immediately below the bar 46 and web W, abutments 76 over which are disposed inking ribbons 77 supplied from rolls 78 carried by said brackets or standards. The free ends of the ribbons 77 pass downwardly through an opening 79 in the bed, and as said ribbons become worn or depleted of ink, said ends may be drawn downwardly by hand to present fresh surfaces to the abutments 76. It will be seen that at each stroke of the ram the bar or marker 46 will be moved toward the web and if permitted to engage the latter will press the same against the inking ribbons 77 and abutments 76 to form marks M on the under surface thereof. The parts are so arranged that the positions of the marks M correspond to the positions of the subsequently formed cross cuts c. Such engagement of the marker with the web is normally restrained under the control of counting mechanism which permits the marker to engage and mark the web only after a predetermined number of strokes of the ram and the consequent formation of a predetermined number of articles. Thus the marking mechanism may be caused to mark the web at points corresponding to the edges of the subsequently formed articles after the formation of every 50, 100, or other predetermined number of articles.

Referring to Figs. 2, 3 and 4, it will be observed that the bar 46 is provided at its ends with lugs 80 which cooperate with abutments or stops in the form of disks 81 carried by a shaft 82 journalled in the side uprights 27 of the auxiliary frame. Engagement of the lugs 80 with the peripheries of the disks 81 normally prevents the bar 46 from engaging the web when the ram descends, the spring 74 yielding to permit the downward movement of said bar to be thus arrested. The disks 81 are formed with notches 83 which, in one position of the shaft 82, receive the lugs 80 to permit the bar 46 to engage and mark the web. The shaft 82 and disks 81 are intermittently rotated, to bring the notches 83 opposite the lugs 80 after a predetermined number of operations of the machine, by mechanism synchronized with the forming mechanism and, as herein shown, substantially as follows: Secured to one end of the shaft 82 at the outer side of the corresponding frame member 27 is a ratchet 84 (see Figs. 3 and 4) to which is imparted a step by step rotation by means of a pawl 85 operated by an eccentric pin 86 on the continuously rotated shaft 41, said pawl being held in engagement with said ratchet by a spring pressed plunger 87 carried by the frame member 27, and retrograde movement of said ratchet being prevented by a holding pawl 88 held in engagement therewith by a spring pressed plunger 89 carried by the corresponding bracket 65.

Referring particularly to Figs. 2 and 5, the perforators 47 comprise punches of suitable configuration and having shanks 90 secured, as by set screws 91, in sockets in plungers 92 guided in a transverse portion 93 of the auxiliary frame. The plungers 92 are carried by stems 94 having an adjustable lost motion connection with the bracket 70. To this end, said stems are preferably guided for longitudinal movement in openings in said bracket and are provided above and below the latter with adjustable stop nuts 95. The punches 47 cooperate with complementary openings in a punch die plate 96 carried by a transverse portion 97 of the auxiliary frame, said punch die having a transverse kerf 98 through which the web passes. The transverse portion 97 of the auxiliary frame is formed hollow to provide an internal chamber communicating with the openings in the punch die and with the opening 79 in the bed 26, whereby the punchings are discharged through the latter.

Referring particularly to Figs. 2, 4 and 6, the combined intermittent feeding and slitting rollers 48 are carried by shafts 99 connected for rotation in unison by intermeshing gears 100. The upper shaft 99 is journalled in boxes 107 while the lower shaft 99 is mounted in semi-cylindrical bearings formed in blocks 180, said boxes and blocks being mounted in vertical slots in the upright portions 27 of the auxiliary frame. The boxes 107 of the shaft of the upper roller are engaged by springs 101 (see particularly Fig. 2ª), whereby said roller is forced toward the lower roller with a yielding pressure which may be adjusted by means of abutment screws 102. The upper roller may be lifted against the tension of the springs 101, to facilitate the introduction of the web, by means of a shaft 103 journalled in the frame members 27 and having an operating handle 104 and eccentric portions 105 which cooperate with gibs 106 engaging extended portions of the journal boxes for the upper shaft 99.

The gear 100 on the shaft 99 of the lower roller meshes with a gear 125 (see particularly Figs. 3 and 4) rotatably mounted on the adjacent upright 27 of the auxiliary frame. The face of the gear 125 is formed with cross grooves 126 to constitute the driven element of an intermittent gear couple of the well known Geneva stop type, the driving element of which comprises a roller 127 carried by a radial arm 128 on the continuously driven shaft 41. The parts are so synchronized that when the ram rises the rollers 48 will be rotated to advance the web and simultaneously slit the same, and when the ram descends said rollers and web will be held stationary.

As herein shown, the forming dies are of the general type disclosed and claimed in Letters Patent No. 1,645,931, October 18, 1927, modified in accordance with the shape of the blanks and the mode of producing the same, and with certain further modifications hereinafter described.

Referring to Figs. 2, 10 and 11, the lower die 54 comprises a plate or block adjustably secured, as by clamping screws 108 and adjusting screws 109, in a recess in the top of a bolster 110 mounted on the bed 26, suitable gibs 111 being preferably interposed between said plate or block and the adjusting screws 109. The die block 54 is formed with openings 112 extending therethrough corresponding in number and arrangement to the blanks B formed at each operation of the machine and in shape and size to the desired outline of the base of the finished plate. As herein shown, the openings 112 are of a suitable shape to form plates of the character shown in Figs. 20 and 21, and each is of substantially rectangular form with outwardly disposed notches 113 at its corners, being of substantially constant cross sectional area throughout its depth. The upper dies 53 cooperate with the openings 112 in the die block 54 and comprise plungers of a size and shape substantially to fit said openings with the clearance necessary to receive the stock. Each plunger 53 is provided with fins or projections 114 to enter the notches 113. Each plunger 53 is of substantially constant cross sectional area throughout except as hereinafter explained, while the projections or fins 114 are of triangular form with their apices at the bottom. The dies 53 are suitably secured, as by bolts 119, to an upper die carrier 120 suitably mounted on the ram 29.

The stripper plate 50 is supported by rods 115 guided in openings in the bed 26 and in brackets 116 depending from the latter, said rods carrying springs 117 by which the stripper plate is normally supported with its upper surface in the plane of the upper surface of the die block 54, which plane is the plane of the web W as the latter leaves the feed rollers 48. The stripper plate is depressed when the ram descends by strikers 8 carried by and depending from the ram 29.

The lower cross-cutting blade 51 is secured, as by screws 121, (Fig. 11) to the forward face of the die block 54, while the upper blade 52 is secured by bolts 122 to the rear face of a depending flange 123 formed at the forward edge of the die carrier 120 and may be adjusted by means of abutment screws 124. Said upper cross-cutting blade is preferably formed in a plurality of sections corresponding to the several strips S, which sections may be independently adjusted by the individual screws 124 for purposes hereinafter explained.

The strips S, after leaving the combined feeding and slitting rollers, pass over the stripper plate 50 and die block 54 and are positioned and centered over the openings in the latter by engagement of the rounded or truncated forward corners of said strips with centering or positioning pins 129 carried by said die block. When the ram descends from the position shown in Fig. 2 into that shown in Fig. 7, the cross-cutters 51 and 52 cooperate to sever blanks B from the ends of the strips S, said blanks being positioned over the openings in the die block. The parts are so arranged that the strikers 8 engage and depress the stripper plate 50 during this part of the descent of the ram, as shown in Fig. 7. Thereafter, as the ram continues to descend from the position shown in Fig. 7 to that shown in Fig. 8, the dies cooperate to form said blanks into articles. During this operation the marginal portions of the blanks are turned or folded upwardly about the plungers upon lines defined by the lower edges of the latter, the resulting surplus material being received in the notches 113 into which it is forced or guided by the fins 114. The plungers 53, while of substantially constant cross sectional area throughout, are preferably slightly tapered from top to bottom, so as to provide for slightly less clearance between themselves and the walls of the openings 112 at the upper end than at the lower end. The clearance afforded at the lower ends of the plungers is amply sufficient to receive the full thickness of the stock operated upon, while that afforded at the upper ends is slightly less than the normal or initial thickness of the stock, thereby resulting in a compression of the sides and folds of the articles adjacent their upper edges to consolidate and strengthen said edges as well as to set the creases at these points. It is found in practice that the quality of the work produced depends to a large degreee upon the provision of exactly the proper clearance at this point, and that the amount of this clearance varies with the thickness and character of the stock. In order therefore to provide for the most effective operation of the mechanism, provision is preferably made for adjusting the amount of clearance. To this end in the construction shown the openings 112 in the die block 54 are defined by adjustable plates 130 lining said openings and having shanks 131 received in recesses in the die block and secured therein by set screws 132 in threaded engagement with said die block and engaging said shanks.

The pressing and consolidating operation above referred to is facilitated by heating the dies, so that the action as the articles are forced through the openings 112 is that of ironing the upper edges of the sides of the articles. As shown in Fig. 2, the upper dies 53 are made hollow with vent openings 133 in their walls, while the upper die carrier 120 is formed with a passage 134 for gaseous fuel having openings 135 communicating with the interior of the dies, whereby jets of flame may be directed against the walls of the latter to heat the same. Similarly, as shown in Figs. 2 and 10, the bolster 110 is formed with gas passages 136 having branches 137 communicating with cavities 138 therein, whereby jets of flame may be directed against the die block 54 to heat the latter.

It will be observed that the punches 47 are located considerably in advance of the forming dies and in positions relatively remote therefrom, the feeding and slitting rollers 48 being positioned between said punches and dies. The heat applied to the dies is therefore not transmitted to any considerable degree to the punches, tending to distort the same as has been found to be the case where the corner cutters are located relatively close to the dies. The cross-cutters 52, which are necessarily located adjacent the dies, are straight and, as above explained, preferably formed in a plurality of relatively short sections which may readily be independently adjusted to compensate for any distortion caused by the heat of the dies.

During the final portion of the descent of the ram from the position shown in Fig. 8 to that shown in Fig. 9, the folded blanks are forced entirely through the openings 112 in the die block, successively formed articles passing thence through registering openings 139 in the bolster 110. The openings 139 are slightly flared outwardly and downwardly and communcate at their lower ends with the stackers 55 which are of a cross sectional area slightly greater than that of the openings 112, but considerably less than that of the original blanks. The successively formed articles are received in nested relation in the stacker, but since their formation is a folding, as distinguished from a molding operation, the resilience of their sides or edge portions causes the latter to engage the walls of the stacker with a resilient pressure sufficient to maintain said articles in nested relation without interfering with their free passage through said stacker.

The stackers 55 are preferably of open or skeleton construction, each of said stackers comprising a suitable number of strips or slats extending at their upper ends into a suitably formed opening 140 in the bed 26 and secured in place therein in any suitable manner. As herein shown, the upper ends of said strips or slats are secured by screws 141 to brackets 142 on the lower face of said bed.

Referring to Figs. 12 and 13, each stacker 55 is preferably of the curved form shown, having a vertical portion communicating with the opening 140 and a horizontal portion extending through and secured in place in an opening in a suitable transverse support 143 carried by the side uprights 25, the discharge end of said curved or horizontal portion being open and being disposed above a suitable table 144. The upper side of said stacker adjacent its discharge end is preferably open, as indicated at 145, whereby the nested articles therein can be readily observed and withdrawn through the discharge end upon the table, the marks M upon the edges thereof facilitating the ready removal of a nested group containing any desired number of articles.

Having thus described my invention, I claim:

1. In a machine for forming articles from sheet material, in combination, heated forming dies, means for feeding a web of material to said dies, and means for perforating said web, said feeding means being located between said dies and perforating means.

2. In a machine for forming articles from sheet material, in combination, means for feeding a web of material, means for perforating said web, means for slitting said web longitudinally, means for cross-cutting said web, said perforating, slitting, and cross-cutting means cooperating to divide said web into polygonal blanks having truncated corners, and means for forming said blanks into articles.

3. In a machine for forming articles from sheet material, in combination, means for feeding a web of material, means for slitting said web longitudinally, means for thereafter cross-cutting said web, said slitting and cross cutting means cooperating to divide said web into blanks, means located in advance of said slitting means and in alinement therewith for perforating said web, whereby said blanks are formed with truncated corners, and means for forming said blanks into articles.

4. In a machine for forming articles from sheet material, in combination, intermittently rotating rollers for feeding a web of material, cutting disks associated with said rollers for slitting said web, web perforators disposed in alinement with said cutting disks, means operating alternately with said rollers for cross-cutting said web, said cutting disks, perforators, and cross-cutting means cooperating to divide said web into blanks having truncated corners, and means for forming said blanks into articles.

5. In a machine for forming articles from sheet material, in combination, heated forming dies, means for feeding a web of material to said dies, means for slitting said web longitudinally, means for perforating said web, said feeding and slitting means being located between said dies and perforating means, and a plurality of independently adjustable cross-cutters located between said feeding means and said dies.

6. In a machine for forming articles from sheet material, in combination, means for feeding a web of material, means for slitting said web longitudinally to divide the same into strips, means for cross-cutting said web to divide said strips into individual blanks, a web perforator of generally quadrilateral form disposed in alinement with said slitting means and with its diagonals disposed respectively longitudinally of and transverse to said web, whereby said blanks are formed with truncated corners, and means for forming said blanks into articles.

7. In a machine for forming articles from sheet material, in combination, means for feeding a web of material, means for slitting said web longitudinally to divide the same into strips, means located in advance of said feeding and slitting means and in alinement with the latter for perforating said web, means located beyond said slitting means for cross-cutting said web to divide said strips into individual blanks, means located beyond said cross-cutting means and engaging the corners of said blanks for centering the latter, and means located between said centering means and cross-cutting means for forming said blanks into articles.

8. In a machine for forming articles from sheet material, in combination, means for feeding a web of material, means for slitting said web longitudinally to divide the same into strips, means located in advance of said feeding and slitting means and in alinement with the latter for perforating said web, means located beyond said slitting means for cross-cutting said web to divide said strips into individual blanks, centering pins located beyond said cross-cutting means, and dies located between said centering pins and cross-cutting means for forming said blanks into articles.

9. In a machine for forming articles from sheet material, a pair of cooperating relatively movable forming dies one of which is provided with an opening and with notches communicating with said opening, and the other of which is constructed and arranged to enter and substantially fit said opening and is provide with fins entering said notches, said parts having provision for adjusting the clearance between said dies.

10. In a machine for forming articles from sheet material, a pair of cooperating relatively movable forming dies one of which is provided with an opening and with notches communicating with said opening, and the other of which is constructed and arranged to enter and substantially fit said opening and is provided with fins entering said notches, adjustable plates carried by said first named die and defining said opening, said plates having shanks and said die having recesses to receive said shanks, and set screws carried by said die and engaging said shanks to secure said plates in adjusted position.

11. In a machine for forming articles of sheet material, in combination, a die having an opening therein shaped to present folding walls and notches between said walls, a plunger cooperating with said opening to fold upwardly marginal portions of blanks of material, said plunger having projections operating in said notches to carry parts of said upturned marginal portions into said notches to form folds and a stacker communicating with said opening and in which the formed articles are received in nested relation, said stacker having a cross-sectional area greater than that of said opening but less than the area of the original blanks.

12. The combination with means for intermittently feeding a web of sheet material and reciprocating means operative alternately with said feeding means to form articles from the material of said web, of a marker movable with said reciprocating means toward and from said web, an abutment normally preventing engagement of said marker with said web, and means controlled by the operation of said reciprocating means for periodically moving said abutment into a position to permit said marker to engage said web.

13. The combination with means for feeding a web of sheet material and means cooperating therewith to form articles from said material, of a marker, yielding means for moving said marker toward said web at each operation of said forming means, an abutment normally preventing said marker from engaging said web and means synchronized with said forming means for periodically moving said abutment into a position to permit said marker to engage said web.

14. The combination with means for feeding a web of sheet material and means cooperating therewith to form articles from said material of a reciprocating marker, yielding means for moving said marker toward said web at each operation of said forming means, a disk engaged by said marker to prevent the same from engaging said web, said disk having a notch to receive said marker and permit the same to engage said web, and means synchronized with said forming means for intermittently rotating said disk to bring the notch therein opposite said marker after the formation of a predetermined number of articles.

15. In a machine for forming articles from sheet material, in combination, heat forming dies, intermittently rotating rollers for feeding a web of material, cutting disks associated with said rollers for slitting said web, web perforators disposed in alinement with said cutting disks, means operating alternately with said rollers for cross-cutting said web, said cutting disks, perforators and cross-cutting means cooperating to divide said web into blanks having turncated corners, and means for forming said blanks into articles.

16. In a machine for forming articles from sheet material, in combination, intermittently rotating rollers for feeding a web of material, cutting disks associated with said rollers for slitting said web, web perforators disposed in alinement with said cutting disks, means operating alternately with said rollers for cross-cutting said web, said cutting disks, perforators and cross-cutting means cooperating to divide said web into blanks having truncated corners, means for forming said blanks into articles, mechanism for counting the articles formed, and means controlled by said counting mechanism for periodically marking said web at points corresponding to the edges of subsequently formed articles.

In testimony whereof I affix my signature.

BERNARD M. FINE.